US008335936B2

(12) United States Patent
Jonsson et al.

(10) Patent No.: US 8,335,936 B2
(45) Date of Patent: Dec. 18, 2012

(54) POWER NODE WITH NETWORK SWITCH

(75) Inventors: Karl Jonsson, Rancho Santa Margarita, CA (US); William Diehl, Dove Canyon, CA (US); Timothy Lyons, Tustin, CA (US); Martin Manniche, Laguna Hills, CA (US); Sonny Windstrup, Copenhagen (DK)

(73) Assignee: Greenwave Reality, Pte Ltd., Singapore (SG)

( * ) Notice: Subject to any disclaimer, the term of this patent is extended or adjusted under 35 U.S.C. 154(b) by 0 days.

(21) Appl. No.: 13/289,160

(22) Filed: Nov. 4, 2011

(65) Prior Publication Data

US 2012/0060044 A1   Mar. 8, 2012

Related U.S. Application Data

(63) Continuation of application No. PCT/US2011/025350, filed on Feb. 18, 2011, which is a continuation-in-part of application No. PCT/US2010/053625, filed on Oct. 21, 2010, and a continuation-in-part of application No. 12/777,229, filed on May 10, 2010, now Pat. No. 8,138,626.

(51) Int. Cl.
*G06F 1/26* (2006.01)
*H02J 3/14* (2006.01)

(52) U.S. Cl. ........ 713/300; 713/310; 713/323; 713/324; 713/340; 307/31; 307/112; 307/113

(58) Field of Classification Search .................. 713/300, 713/310, 320–324, 330, 340; 307/31, 112–113, 307/125–126, 130–131, 139; 361/641, 643, 361/647

See application file for complete search history.

(56) References Cited

U.S. PATENT DOCUMENTS

| 4,858,141 | A  |   | 8/1989  | Hart et al.          |
|-----------|----|---|---------|----------------------|
| 5,258,656 | A  |   | 11/1993 | Pawlick              |
| 5,301,122 | A  |   | 4/1994  | Halpern              |
| 5,483,153 | A  |   | 1/1996  | Leeb et al.          |
| 5,650,771 | A  |   | 7/1997  | Lee                  |
| 5,717,325 | A  |   | 2/1998  | Leeb et al.          |
| 5,754,963 | A  |   | 5/1998  | Nunneley et al.      |
| 6,445,087 | B1 | * | 9/2002  | Wang et al. ..... 307/40 |
| 6,476,729 | B1 |   | 11/2002 | Liu                  |
| 6,492,897 | B1 |   | 12/2002 | Mowery               |

(Continued)

FOREIGN PATENT DOCUMENTS

KR   101-2009-0095689 A   9/2009

OTHER PUBLICATIONS

Notice of Allowance for U.S. Appl. No. 12/777,229, USPTO, Nov. 26, 2011.

(Continued)

*Primary Examiner* — Fahmida Rahman
(74) *Attorney, Agent, or Firm* — Bruce A. Young

(57) ABSTRACT

A power node provides energy management and network expansion features in a networked data communications and control environment that may be utilized in an energy management system implementing a method of managing energy. Network expansion may be provided by integrating a networking bridge from a power line network to one or more wired network ports or a wireless network. The power outlet on the power node providing power to a device may be identified and associated with information about the device.

7 Claims, 11 Drawing Sheets

U.S. PATENT DOCUMENTS

| | | | |
|---|---|---|---|
| 6,987,444 B2 | 1/2006 | Bub et al. | |
| 6,993,417 B2 | 1/2006 | Osann, Jr. | |
| 7,579,711 B2 | 8/2009 | Menas et al. | |
| 7,663,866 B2* | 2/2010 | Lee et al. | 361/601 |
| 7,772,718 B2 | 8/2010 | Lee et al. | |
| 7,885,917 B2 | 2/2011 | Kuhns et al. | |
| 7,961,111 B2 | 6/2011 | Tinaphong et al. | |
| 7,970,542 B2 | 6/2011 | Bent et al. | |
| 8,013,545 B2 | 9/2011 | Jonsson | |
| 2003/0050737 A1 | 3/2003 | Osann | |
| 2004/0175078 A1 | 9/2004 | Imamura | |
| 2006/0202557 A1 | 9/2006 | Menas et al. | |
| 2006/0271544 A1 | 11/2006 | Devarakonda et al. | |
| 2007/0041340 A1 | 2/2007 | Binder | |
| 2007/0050647 A1* | 3/2007 | Conroy et al. | 713/300 |
| 2007/0091925 A1* | 4/2007 | Miyazaki et al. | 370/469 |
| 2007/0135973 A1 | 6/2007 | Petite | |
| 2007/0155349 A1* | 7/2007 | Nelson et al. | 455/128 |
| 2007/0297112 A1 | 12/2007 | Gilbert | |
| 2008/0094210 A1 | 4/2008 | Paradiso et al. | |
| 2009/0059602 A1 | 3/2009 | Santos et al. | |
| 2009/0198385 A1* | 8/2009 | Oe et al. | 700/296 |
| 2009/0207034 A1 | 8/2009 | Tinaphong et al. | |
| 2009/0234512 A1* | 9/2009 | Ewing et al. | 700/295 |
| 2009/0236909 A1 | 9/2009 | Aldag et al. | |
| 2009/0322159 A1 | 12/2009 | DuBose et al. | |
| 2010/0005331 A1 | 1/2010 | Somasundaram et al. | |
| 2010/0084992 A1 | 4/2010 | Valois et al. | |
| 2010/0090542 A1 | 4/2010 | Johnson et al. | |
| 2010/0109619 A1* | 5/2010 | Tsou et al. | 323/234 |
| 2010/0141153 A1 | 6/2010 | Recker et al. | |
| 2010/0145542 A1* | 6/2010 | Chapel et al. | 700/295 |
| 2010/0191487 A1 | 7/2010 | Rada et al. | |
| 2010/0264752 A1* | 10/2010 | Wong et al. | 307/116 |
| 2011/0031819 A1 | 2/2011 | Gunwall | |
| 2011/0062874 A1 | 3/2011 | Knapp | |
| 2011/0090042 A1* | 4/2011 | Leonard et al. | 340/5.1 |
| 2011/0098867 A1 | 4/2011 | Jonsson et al. | |

OTHER PUBLICATIONS

A. Pudenzi, A Neuron Nets Based Procedure for Identifying Domestic Appliances Pattern of Use from Energy Recordings at Meter Panel, IEEE, 2002.

Non-Final Office Action for U.S. Appl. No. 12/795,629, USPTO, Oct. 24, 2011.

Hart, G. W., Nonintrusive appliance load monitoring, Porceedings of the IEEE, vol. 80, No. 12, Dec. 1, 1992, pp. 1870-1891, IEEE, New York, NY, US.

Notice of Allowance for U.S. Appl. No. 12/795,395, USPTO, Jul. 22, 2011.

INT6400 Homeplug(R) AV Chipset Overview, Oct. 21, 2010, Atheros Communications, Inc., http://www.atheros.com/media/product/product_70_file1.pdf, retrieved on Jan. 7, 2011.

AR8236 6-Port Low-Power, Fast Ethernet Switch Overview, Dec. 6, 2010, Atheros Communications, Inc., http://www.atheros.com/media/product/product_100_file1.pdf, retrieved on Jan. 7, 2011.

NETSTRIP2000+ Overview, Jul. 2008, LEA S.A.S, http://homeplug.certapp.net/media/files/certification/briefs/NetStrip200UK.pdf, retrieved on Jan. 7, 2011.

XE104 Datasheet, 2007, Netgear, Inc., http://homeplug.certapp.net/media/files/certification/briefs/enus_ds_xe104_24apr07.pdf, retrieved on Jan. 7, 2011.

PE923-EB Datasheet, 2009, Gigafast E Ltd., http://homeplug.certapp.net/media/files/certification/briefs/PE923-EB.pdf, retrieved on Jan. 7, 2011.

Notice of Allowance for U.S. Appl. No. 12/795,629, USPTO, Mar. 29, 2012.

Notice of Allowance for U.S. Appl. No. 12/795,629, USPTO, Apr. 18, 2012.

* cited by examiner

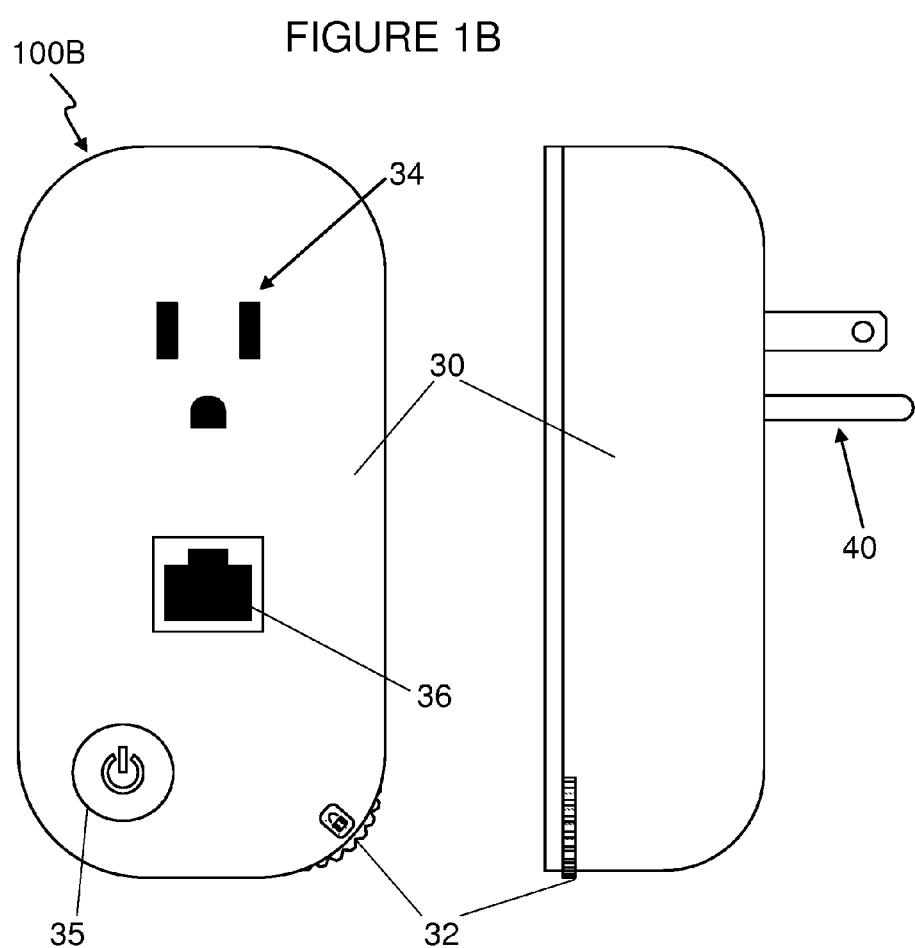

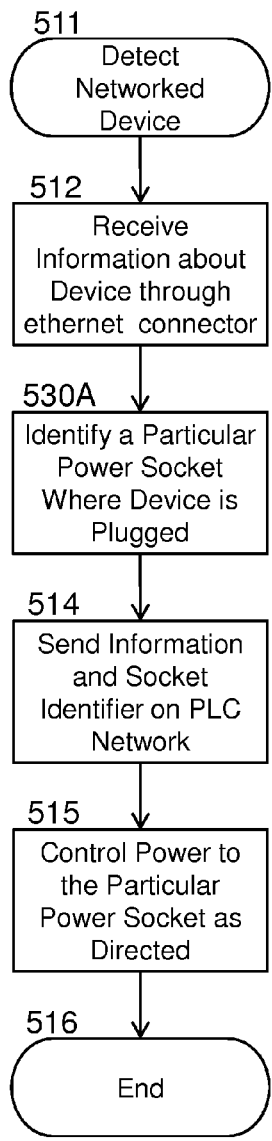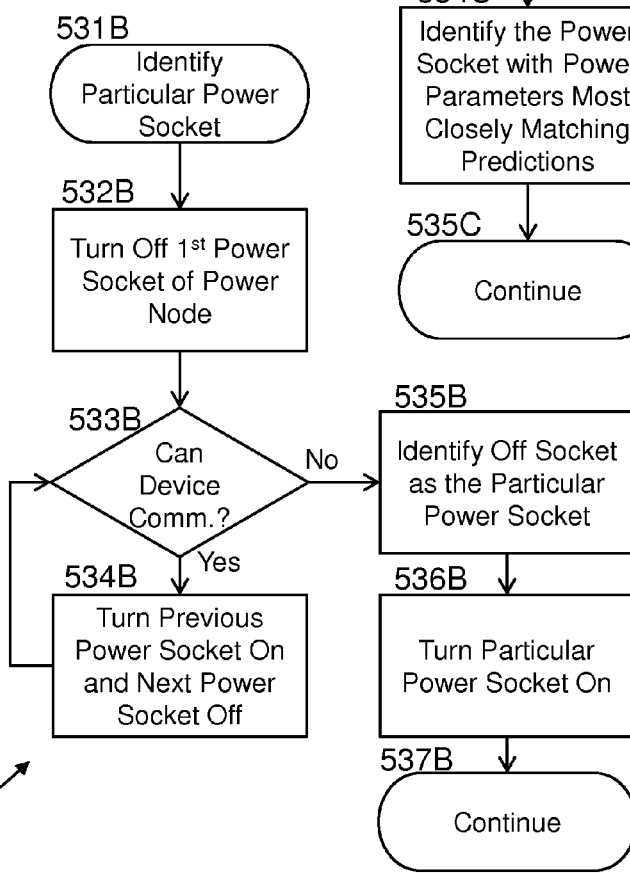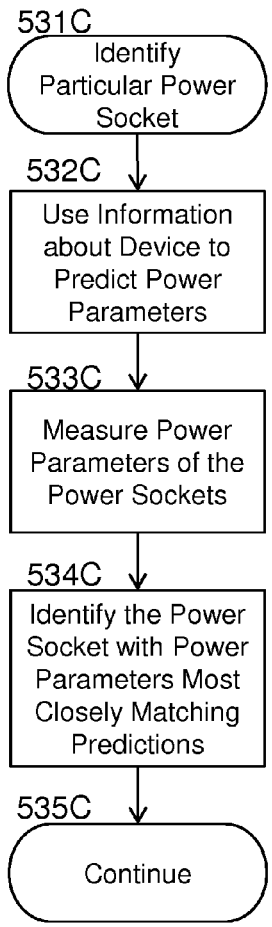

POWER NODE WITH NETWORK SWITCH

CROSS-REFERENCE TO RELATED APPLICATIONS

This application is a continuation of International Patent Application No. PCT/US11/025350 filed on Feb. 18, 2011, which is a continuation-in-part of U.S. patent application Ser. No. 12/777,229 filed on May 10, 2010 and is a continuation-in-part of International Patent Application No. PCT/US10/053625 filed on Oct. 21, 2010, the entire contents of which are all hereby incorporated by reference.

BACKGROUND

1. Technical Field

The present invention relates to an electrical power controller. In particular, a power node that also provides networking functionality.

2. Description of Related Art

Electric power strips typically have a plurality of electrical outlets mounted within an enclosure and an attached power cord for electrically interconnecting the outlets with an AC power source. While modern power strips may include overload protection and/or surge protection, they do not generally include signal and power electronics enabling the power strip to be incorporated into a networked energy management system.

As home networking has become common, several types of networking have become important including wired ethernet, wireless IEEE 802.11 Wi-Fi, IEEE 802.15.4 Zigbee, Z-Wave wireless networking, and powerline networking including networking using protocols from HomePlug® Powerline Alliance, HD-PLC Alliance and/or IEEE P1901.

SUMMARY

A power node may include a power plug and a power socket with a power switch interposed between the power plug and the power socket. A first network interface utilizing a powerline communication physical layer is configured to communicate through the power plug and bridge circuitry is configured to bridge between the first network interface and a second network interface utilizing a second physical layer to provide a bridged network. A processor is configured to control the power switch and to communicate over the bridged network. The processor may control the power switch based on a command received over the bridged network.

A method of reporting what device is plugged into a particular power socket of a power node may include receiving information about a device through a first network interface located on a power node. The first network interface uses a protocol that is does not utilize power line communication. A particular power socket on the power node from which the device is receiving power may be identified and at least some of the information about the device and an identifier of the particular power socket may be sent across a second network interface using power line communication. The flow of power to the particular power socket may also be controlled.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings:

FIG. 1B shoes an alternative embodiment of a power node for energy management;

FIG. 10A-C are flowcharts depicting methods of determining and/or reporting what device is plugged into a particular power socket of a power node.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Reference now is made in detail to the examples illustrated in the accompanying drawings and discussed below.

Figure 1A:
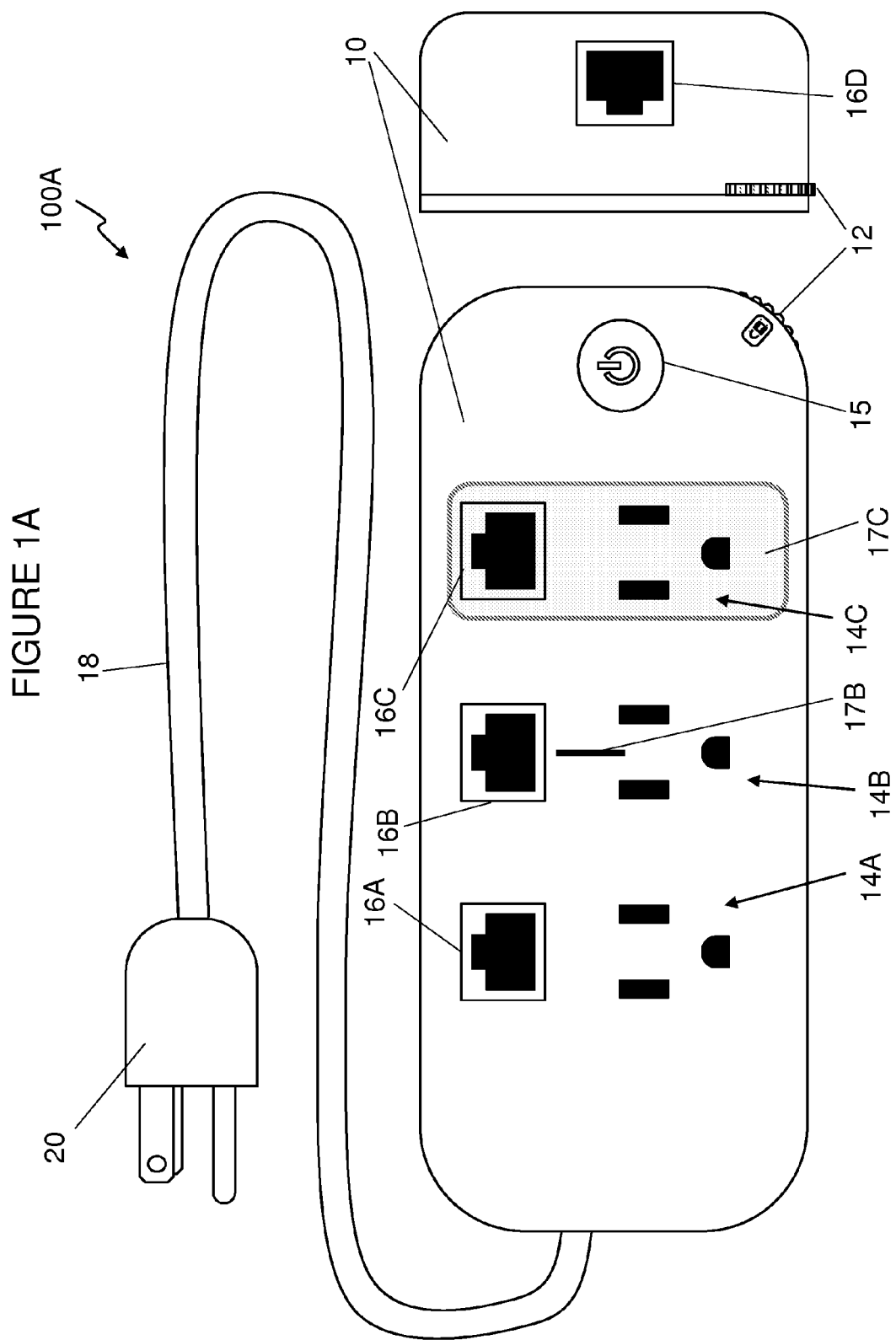
FIG. 1A shows a power node for energy management.

FIG. 1A shows an embodiment of a power node 100A. A power node housing or enclosure 10 includes one or more outlets 14A-C (sometimes referred to as power outlets, power sockets, or electrical outlets) that are electrically coupled with a power node cord 18 that is typically terminated with a power plug 20. The power node cord 18 and power plug 20 may be known as an input power coupler. Accessible to the power node user in some embodiments, is a dial selector 12, and in some embodiments, an "On" button 15. Network connectors 16A-D may allow the power node 100A to provide for network expansion. Within the power node housing are power and signal electronics discussed more fully below.

In some embodiments, at least some of the network connectors 16A-C may be associated with at least some of the outlets 14A-C. Network connector 16D is not associated with any outlet and in some embodiments, there may be outlets that are not associated with any network connectors. The association may be identified using any sort of marking, mold feature, physical proximity, color or other technique. In FIG. 1A, outlet 14A and network connector 16A are associated and the association is so indicated simply by physical proximity. Outlet 14B and network connector 16B are associated and the association is indicated by the simple line 17B that may be painted or otherwise marked on the enclosure 10. Other embodiments may use a wide variety of markings such as boxes, lines, labels or other markings to show the associate and such markings may be created with paint, labels, silkscreen or other techniques. Outlet 14C is associated with network connector 16C and the association is indicated by a slight depression 17C surrounding the outlet 14C and network connector 16C. Other embodiments may use a wide variety features created in the molding process such as embossed lines, embossed labels, raised areas, areas with different textures, or other molded-in features.

FIG. 1B shows an embodiment of a power node 100B. A power node housing or enclosure 30 includes an outlet 34 that is electrically coupled with a power plug 40, or input power coupler, extending directly from the housing 30 allowing the power node 100B to be directly plugged into a wall outlet. Accessible to the power node user in some embodiments is a dial selector 32, and in some embodiments, an "On" button 35. A network connector 36 may allow the power node 100B to provide for network expansion. In this embodiment, the single outlet 34 and the single network connector 36 are associated with each other. Within the power node housing are power and signal electronics discussed more fully below.

Figure 1C:
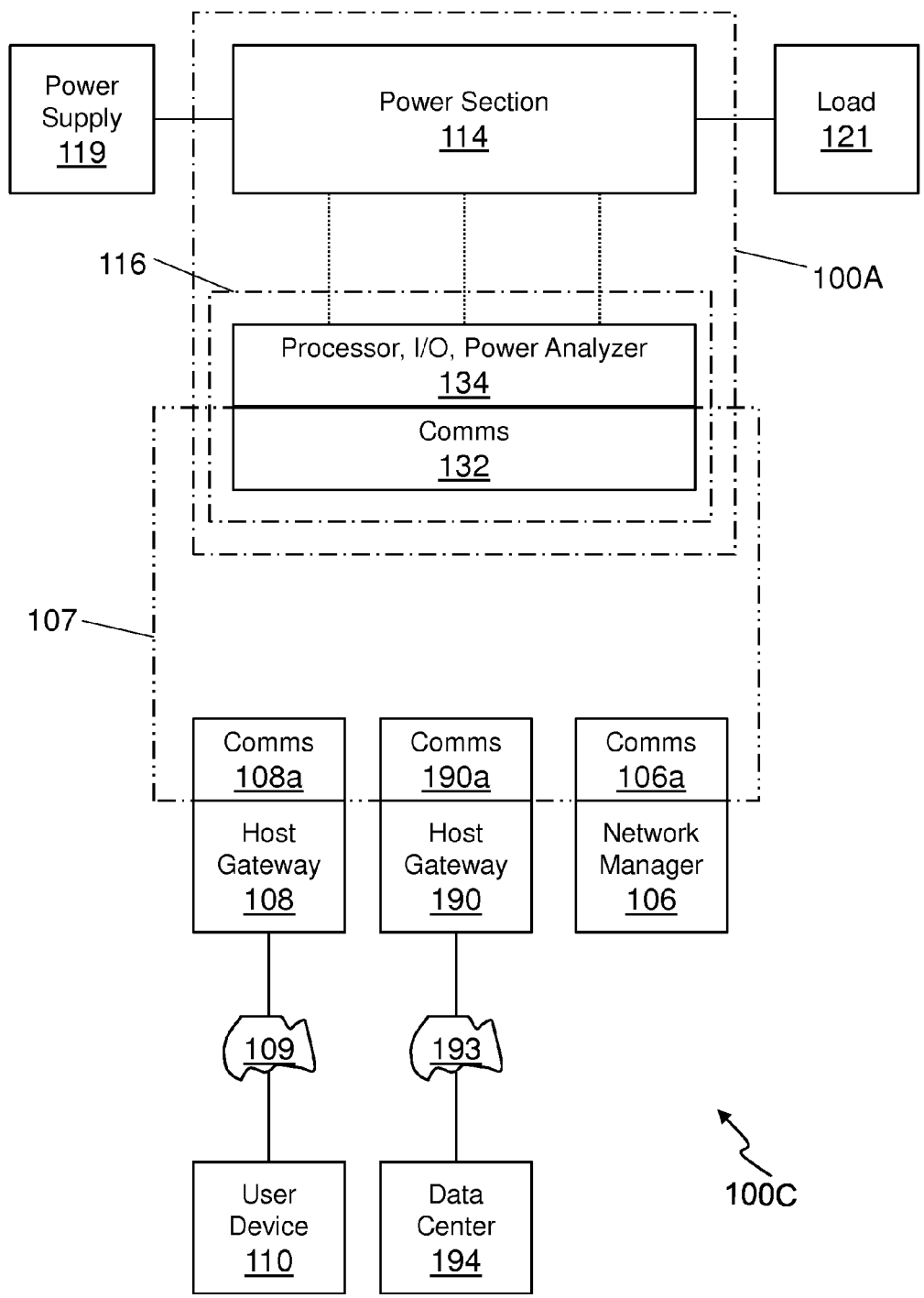
FIG. 1C shows a block diagram of an energy management system including a power node.

FIG. 1C shows an embodiment of a power management system 100C. In an embodiment, one or more power nodes 100A and/or 100B include respective power 114 and signal 116 electronics sections (electronics for one power node shown). Within the signal electronics section 116 is a communications and control means 132 for exchanging data with a local network 107. The network 107 may be any suitable network known to persons of ordinary skill in the art including; wired, such as Ethernet or other IEEE 802 wired standards; wireless, such as 802.11 a/b/g/n or other IEEE 802 wireless standards, or Zigbee, or Z-Wave; or, power line communications, such as HomePlug®, INSTEON® or X10 networks. In some embodiments a HomePlug® network is used.

In some embodiments, the communications means 132 includes a power line communications ("PLC") device such as a PLC modem for communicating with a gateway 108a, 190a that is also equipped with a PLC device, the two PLC devices being coupled for communication via electric power lines such as the electrical wiring of a building or structure. In an embodiment, an Ethernet switch in the power node 100A or 100B is coupled to the power node PLC and provides one or more Ethernet connections such as an Ethernet connection enabling functions of the power node and an Ethernet connection available to devices external to the power node. More detail on an embodiment for the PLC to ethernet switch is shown in FIG. 2B.

In various embodiments, a networked power node 100A/100B utilizes the network to communicate with other devices. For example, a host gateway device 108 having a network interface 108a can transmit commands to or receive data from a power node 100A/100B. In this embodiment, a user device and/or processor 110 such as a controller, a special purpose controller, a personal computer, or a special purpose computer, is capable of issuing commands to or receiving data from a power node via the local network 107 by using a connection 109 to the gateway 108. In some embodiments, the host gateway includes one or more of the user device functions. Connections 109 between the user device 110 and the gateway 108 can use any suitable wired or wireless connection including the network connection types mentioned above, USB, RS-232, Bluetooth, or other wired or wireless connections.

A gateway 108 is configured in various embodiments to handle known TCP/IP based devices utilizing, for example, an IP based API available from the gateway. In an embodiment, the gateway 108 uses a simple SSDP discovery daemon allowing IP devices on the network 107 to find it. Typical TCP/IP devices include one or more of an iPhone®, iPad, iPod®, network connected tablet, TV, bluray player, personal computer, and the like.

In some networked embodiments a network management device 106 having a means for communicating with the network 107, such as a network controllers or network coordinators 106a, is included for implementing network management functions. Network management functions can include, among other things, maintaining a list of interconnected devices and maintaining routing tables. In particular, network coordinators are used with Zigbee networks and controllers are used with Z-Wave networks. Network management devices may supplement and/or duplicate the functionality provided by gateway device(s) 108 and their interconnected user devices 110.

And, in some networked embodiments, a second gateway 190 with second gateway communications block 190a interconnects via an external network 193 with a data center 194 (as shown). In other embodiments, the datacenter external network communicates via the host gateway connection 109.

In an exemplary system including one or more power nodes 100A/100B, a host gateway 108 and a user device 110, each of these devices includes memory for storing a device identification code. Device identification codes enable messages to be routed to the correct device. In an embodiment, a common group or home identification code is used to enable communication among members of the group.

Figure 2A:
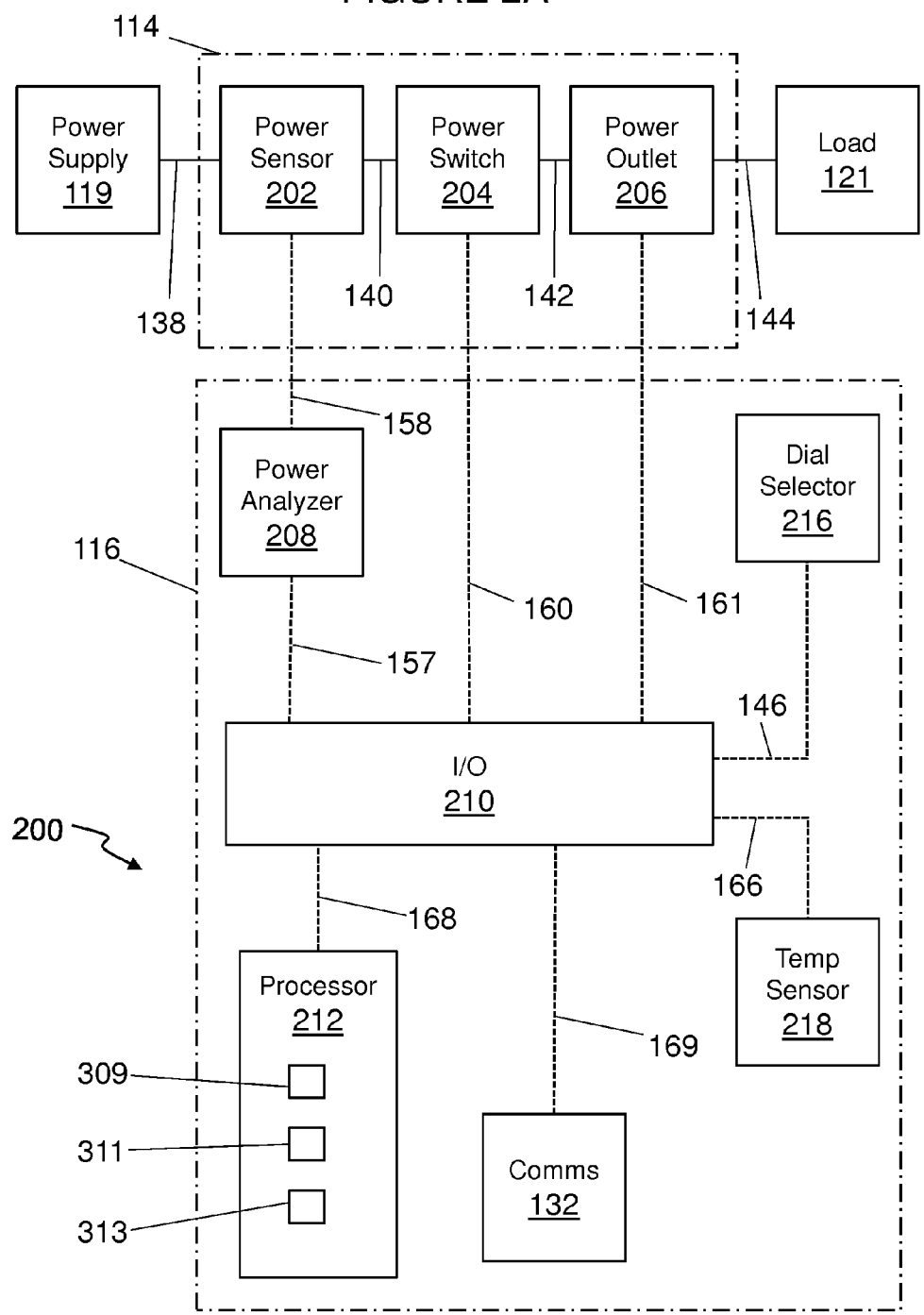
FIG. 2A shows a first block diagram of the power node of FIG. 1A or 1B.
Figure 2B:
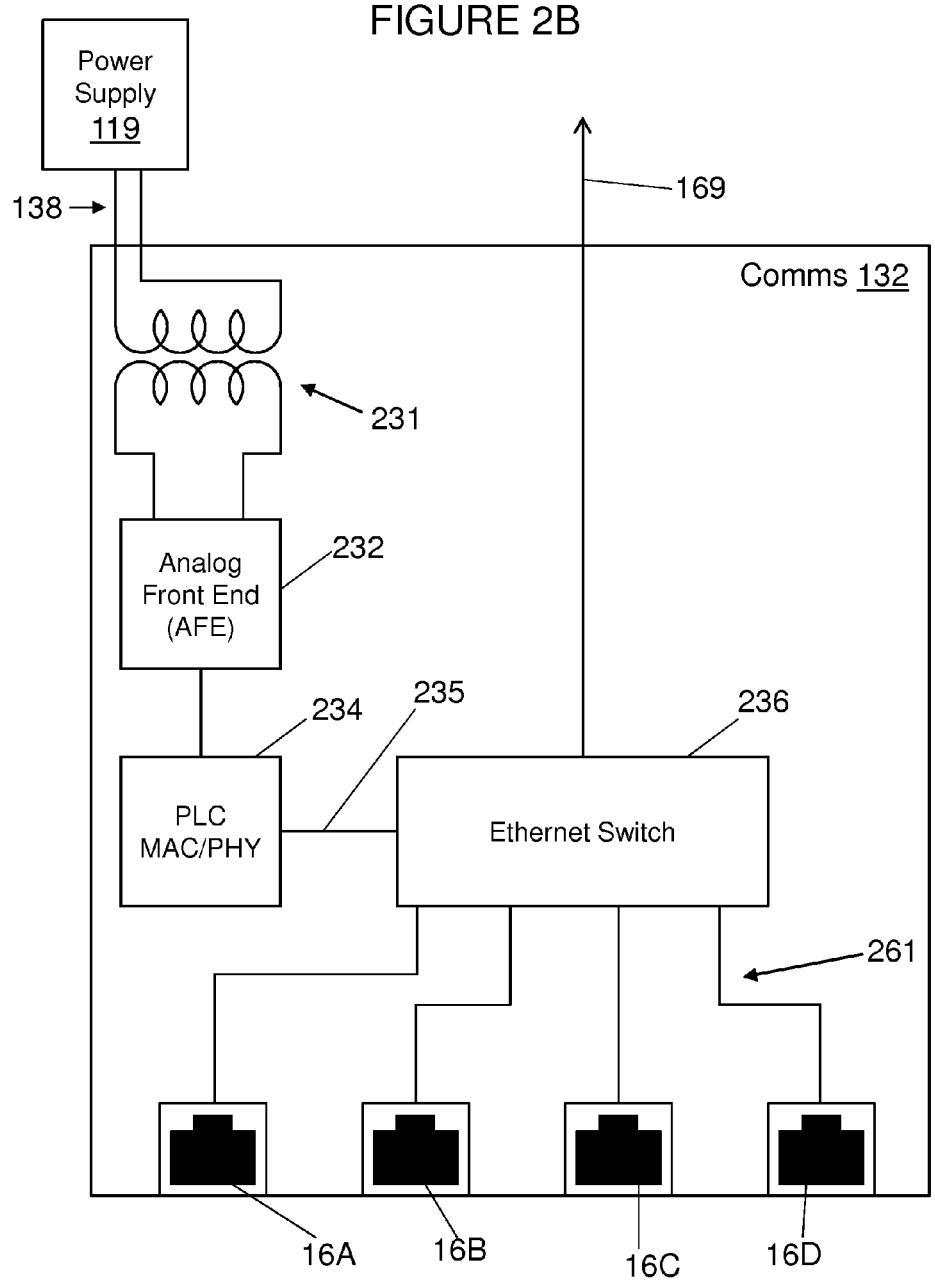
FIG. 2B shows an expanded block diagram of the communications block of FIG. 2A.

FIG. 2A shows an embodiment 200 of power node 100A/100B. As described above, the power node 100A/100B includes a signal electronics section 116 and a power electronics section 114.

Signal electronics include an input/output ("I/O") block 210 coupled to each of a processor and memory block 212, and a communications block 132. In various embodiments, one or more of a power analyzer block 208, a dial selector block 216 and a temperature sensor block 218 are coupled to the I/O block. And, in some embodiments, an Ethernet switch is included in the communications block 132 or in addition to the communications block 132.

In various embodiments of the signal electronics section 116, a wireless module such as a Z-Wave or Zigbee module is used to implement the I/O block 210, processor block 212, and communications block 132. For example, a Sigma Designs ZM3102 Z-wave module is used in one embodiment and a Zigbee chipset is used in another embodiment. In some embodiments, the input/output functionality is enhanced with a general purpose I/O expander integrated circuit such as an NXP PCA9534BS 8-bit I2C-bus and SMBus low power I/O port with interrupt.

In an embodiment, a power/energy integrated circuit such as a Cirrus Logic CS 5463 integrated circuit may be used to implement the power analysis functionality of the power analyzer block 208. Power consumption and other data available from the power analysis device includes one or more of real/active power, instantaneous and/or RMS values of current and voltage, apparent power, reactive power, fundamental power, and temperature sensing. As will be understood by persons of ordinary skill in the art, waveform profiles of one or more of voltage, current, and power can be constructed by any processor in signal communication with the I/O block.

The power section 114 includes a power sensor block 202, a power switch block 204, and a power outlet block 206. The power sensor block is coupled to a power source 119 via a first power circuit 138. The switch block 204 is coupled to the power sensor block via a second power circuit 140 and to an outlet 206 via a third power circuit 142. A load 121 is coupled to the outlet via a fourth power circuit 144.

The power analyzer 208 of the embodiment shown in FIG. 2A is coupled to the power sensor block 202 via a signal line 158 and to the I/O block via a signal line 157. Switch block 204 is coupled to the I/O block by a signal line 160. Outlet block 206 is coupled to the I/O block via a signal line 161.

The processor block 212 is coupled to the I/O block 210 via a signal line 168. Where used, dial selector block 216 is coupled to the I/O block via a signal line 146 and temperature sensor block 218 is coupled to the I/O block via a signal line 166. The communications block is coupled to the I/O block via a communications a signal line 169.

In some embodiments, a metering system 309 is implemented in the processor 212. The metering system 309 may aggregate power consumption for each outlet 206 to produce a meter report. In some embodiments an over current protection system ("OCPS") 313 is implemented in the processor 212. The over current protection system compares measured current for each outlet 206 and for all outlets against safety limits and disconnects offending appliances in case of excess loads. And, in some embodiments a change detection system ("CDS") 311 is implemented in the processor 212. These systems are discussed more fully below.

FIG. 2B shows more detail for an embodiment that utilizes a power line communications (PLC) network such as Home-Plug® for communication. In an embodiment utilizing the communications block 132 shown in FIG. 2B, the processor 212 may have an ethernet connection or an ethernet connection may be included in the I/O block 210.

The power bus 138 from the power supply 119, which may be an alternating current (AC) circuit, may be coupled into the communications block 132 utilizing a transformer 231. An analog front end (AFE) circuit 232 may be coupled to the transformer 231 to send and/or receive signals coupled on the power but 138. In one embodiment the AFE may be implemented using an INT1400 integrated circuit from Atheros Communications, Inc. The AFE may be coupled to a PLC media access controller (MAC) and physical layer interface (PHY) block 234. The PLC MAC/PHY 234 may be implemented using an INT6400 integrated circuit from Atheros Communications, Inc. The INT1400 AFE and INT6400 MAC/PHY integrated circuits may be compatible with the HomePlug® AV network protocol specification and may provide up to a 200 Mb/s signaling rate over the power line. The PLC communications may be used for the network 107 or as a part of the network 107. Other embodiments may be compatible with different PLC protocols.

The MAC/PHY 234 may provide a media independent interface (MII) 235 for ethernet protocol communication. The MII 235 may be coupled to an ethernet switch 236 integrated circuit such as the AR8236 6-Port Low-Power Fast Ethernet Switch from Atheros Communications, Inc. allowing communications between the various ethernet ports of the ethernet switch 236. One output of the ethernet switch 236 may be used to communicate to the processor 212 over communication signal line 169, which in the embodiment shown may be a 100-Base-T ethernet connection. The other four 10/100-Base-T ethernet connections 261 may be connected to RJ-45 ethernet connectors 16A-D that may have integrated magnetics components for compliance with ethernet specifications. Various embodiments may have any number of ethernet ports from the ethernet switch 236 with zero, one or more ports used inside the power node 100A/100B and zero, one or more ports brought out to ethernet connectors 266 with the power node 100A/100B bridging between the various ports.

Figure 9:
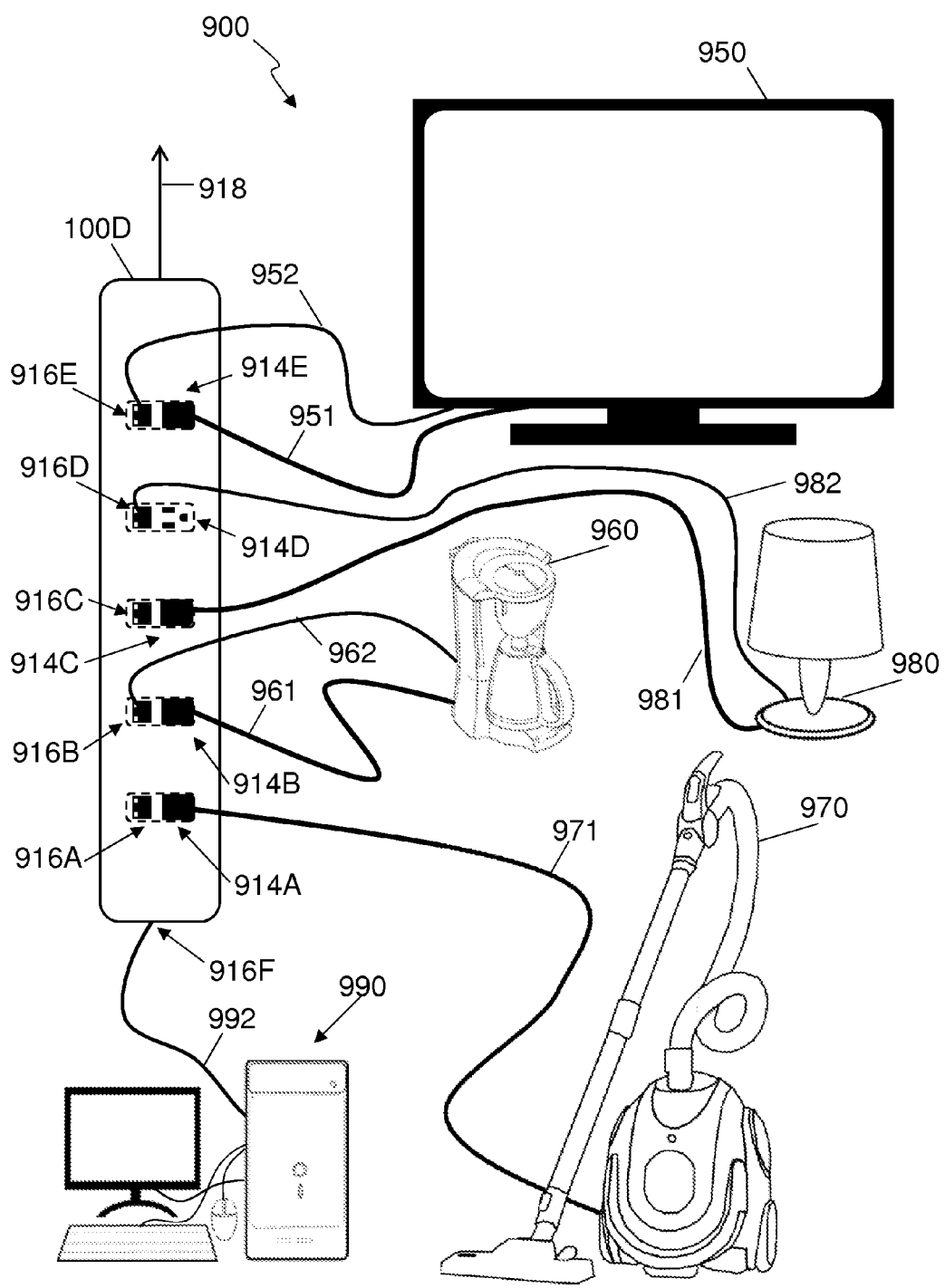
FIG. 9 shows several devices plugged into a power node.

In other embodiments, the ethernet switch 236 may provide functionality for the processor 212 to selectively communicate to a particular ethernet connector 16A-D. By using such functionality, the processor may be able to receive information about the device that is physically plugged into the particular ethernet connector 16A-D. As shown in FIG. 1A, a particular ethernet connector 16A-D may be associated with a particular outlet 14A-C. The processor 212 may have these associations pre-programmed so that it can associate information received from a device through a particular ethernet connector 16A-D with a particular outlet 14A-C. For example, as shown in FIG. 9, a networked coffee pot may 960 be plugged into outlet 914B and network connector 916B. The processor 212 may selectively communicate over network connector 916B to the networked coffee pot 960 and determine that the networked coffee pot 960 has a MAC address of 01-23-45-67-89-AB. The processor 212 may then identify that outlet 914B is sending power to the networked coffee pot 960 due to the proximity of the outlet 914B and the network connector 16B, and send the MAC address of the networked worked coffee pot, 01-23-45-67-89-AB, along with an identifier of outlet 914B, across the PLC network to a gateway 108 or to some other device that may gather information about the network 107 and/or allow a user to control devices on the home network 107. The gateway 108 may use the information received to clearly match information that it may determine about devices on the network 107 using SSDP or other techniques with the particular outlet that is providing power to those devices. This may allow more accurate assignment of the energy usage and/or costs to a particular device.

Alternative embodiments may include a bridge from the PLC connection to a wireless connection such as 802.11 Wi-Fi, 802.15.4 Zigbee, Z-Wave or other radio frequency networks. In some embodiments, the access point or gateway circuitry for the radio frequency network may connect to one port of the ethernet switch 236 to provide a communications link between the PLC network and the wireless network as well as the other ethernet ports. In other embodiments the access point or gateway circuitry may take the place of the ethernet switch 236 providing for the communication signal line 169 to the processor 212 as well as the bridge to the wireless network devices.

For the purposes of this specification and claims, bridging may refer to connections between two network segments performed at any level of the Open Systems Interconnection (OSI) Model, including network routing done at OSI Layer 3 (network layer), network bridging performed at OSI Model Layer 2 (data-link layer), network repeating performed at OSI Model Layer 1 (physical layer) or other methods of connecting two network segments and should not be limited to data-link layer bridging, and as such, may include methods that are not compliant with the IEEE 802.1 D bridging standard.

In the embodiment shown in FIG. 2B, the network 107 may be a heterogeneous network with some devices communicating using wired ethernet connections, other devices communicating using PLC connections and other devices communicating over a wireless network. The heterogeneous network may be referred to as the bridged network. Communication over the bridged network may allow data to travel across one or more of the bridged network segments but may not require that all data sent over the bridged network travel over every segment of the bridged network.

Figure 3:
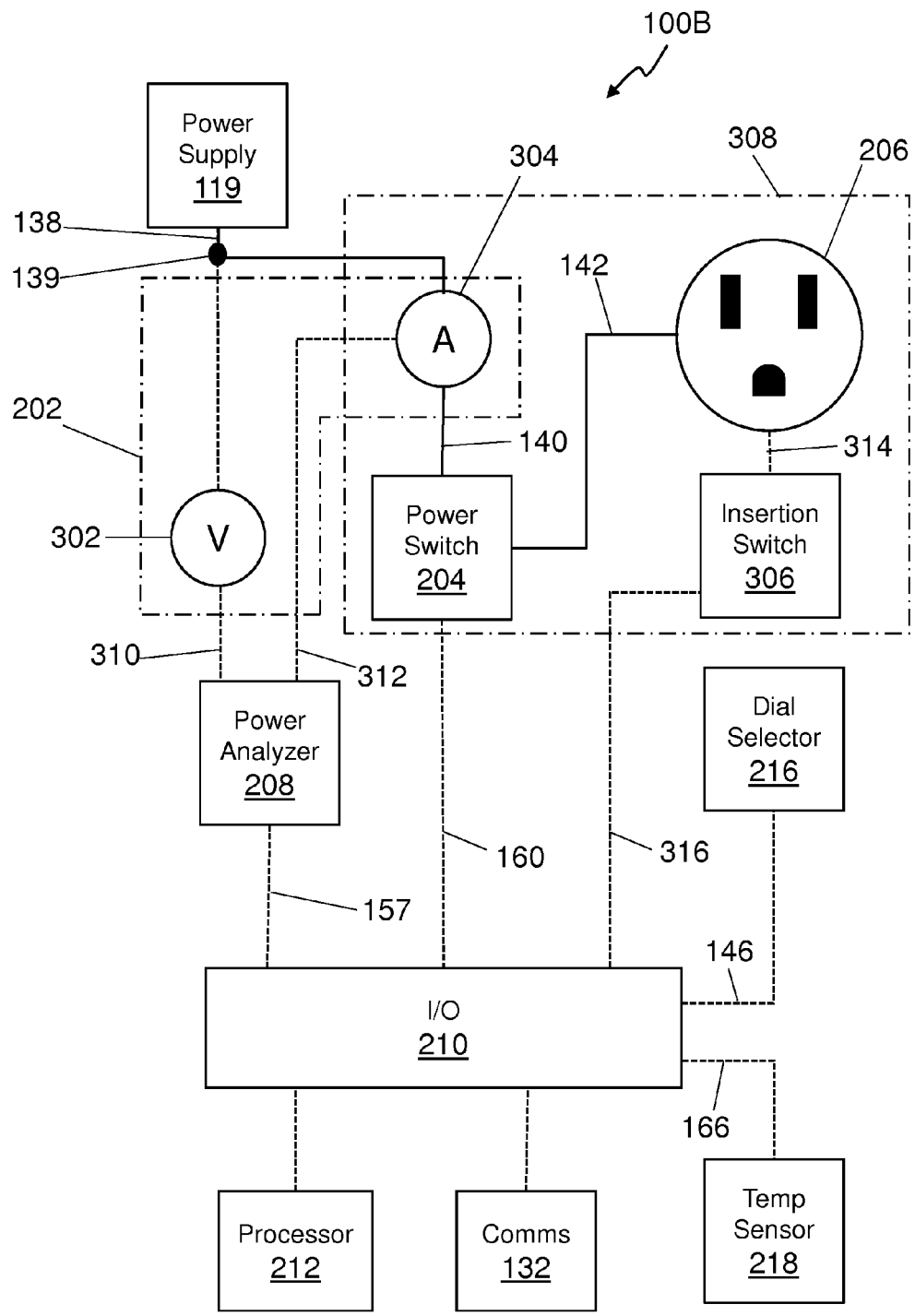
FIG. 3 shows a second block diagram of the power node of FIG. 1A or 1B.

FIG. 3 shows a power node 100B having a single outlet 206. This single outlet embodiment provides a single power channel 308 including an outlet 206, a power switch 204 and a current sensor 304. The power channel receives electric power via a bus tap 139 on a power bus 138. In other embodiments, a plurality of power channels provide respective outlets in multi-outlet power nodes.

Power supplied to the outlet 206 is sensed by a power bus voltage sensor 302 and the power channel current sensor 304, together the power sensor block 202. Voltage and current sensor output signal lines 310, 312 are coupled to the power analyzer block 208 which is coupled to the I/O block 210. In some embodiments, voltage is measured at a gateway 108, 190 rather than at individual power nodes 100A/100B. This may provide valid measurements as it can be assumed that in most instances, the power node 100A/100B and the gateway 108, 190 are on the same voltage distribution leg in the home so the voltage between devices will not vary that much.

In an embodiment, a voltage sensor 302 measures the power node bus voltage. Here, the power supplied to each outlet 206 is known since outlet voltage for all outlets should be the same, and the respective outlet currents are measured by the respective current sensors 304. Further, the power being supplied to the power node 100A/100B from the power supply 119 is approximately equal to the power drawn by all of the power node outlets and is also know.

In some embodiments, the voltage at each outlet is monitored by a respective voltage sensor located between the outlet 206 and the power switch 204. This embodiment provides for, inter alia, measuring a load's voltage decay after the power switch is opened. In other embodiments, an analog multiplexor consisting of relays, field effect transistors (FETs), or other electro-mechanical or electronic devices, may be interposed between the voltage sensors and each outlet 206 to allow a single voltage sensor to selectively measure the voltage at each outlet 206 individually, independent of the state of the power switches 204

Interposed between the power supply 119 and the outlet 206 is a power switch 204. A power switch signal line 160 couples the I/O block 210 with the power switch. The switch may be any switch known in the art that allows for automated control, such as a mechanical or solid state relay, or a semiconductor switch. In one embodiment a latching type relay is used and in another embodiment a TRIAC type switch may be used.

The outlet 206 is coupled to a power output of the power switch 204 via the third power circuit 142. In some embodiments, an insertion switch 306 senses 314 whether a plug is inserted in the outlet 206 and provides an insertion signal to the I/O block 316.

In an embodiment, consumption of each connected load or appliance 121 is monitored during appliance standby periods such that standby power consumption is measured. Typically, an appliance's standby power level is the lowest non-zero power level associated with the appliance. Here, gateway and/or user device 108, 110 selections enable the user to interrupt power flow to an appliance in a standby mode. In some embodiments, the user can define a standby time period which, if exceeded, automatically opens the associated power switch 204 to interrupt the appliance standby power flow.

Plug insertion sensing may be accomplished by any means/device known to persons of ordinary skill in the art. For example, various embodiments employ a capacitive sensor, an optical sensor, and a mechanical sensor. All of these devices are referred to herein as an "insertion switch."

Figure 4:
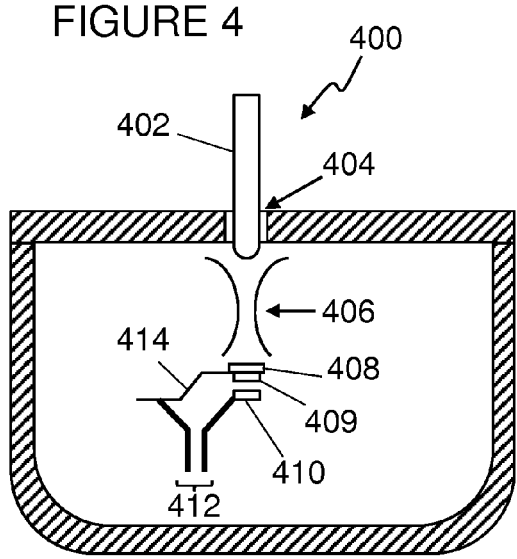
FIG. 4 shows a diagram of an insertion switch of the power node of FIG. 1A or 1B.

FIG. 4 shows an electro-mechanical insertion switch 400. This switch utilizes a spring arm 414 that is depressed by a blade of a plug 402 when the blade is inserted in the outlet opening 404 and between spring contacts 406 of an outlet power circuit. The inserted blade contacts a pressure pad such as an insulator 408 at one end of the spring arm and pushes a moving contact 409 against a stationery contact 410 closing the circuit 412. The closed circuit is the signal that a plug is inserted in the outlet 206.

In some embodiments, a dial selector 216 is coupled to the I/O block 210. The dial selector provides a means for selecting an environmental variable through the use of symbols, letters, numbers, colors, or other indicia associated with dial selector positions. For example, one setting might be used for a power node located in a home theatre while another setting might be used for a power node located in a bedroom. Environmental variables are used in various embodiments to designate a particular room, a category of electrical loads such as a home theatre, a predefined scene such as conserve energy, a particular use such as entertainment, and a particular time or season such as winter.

Figure 5:
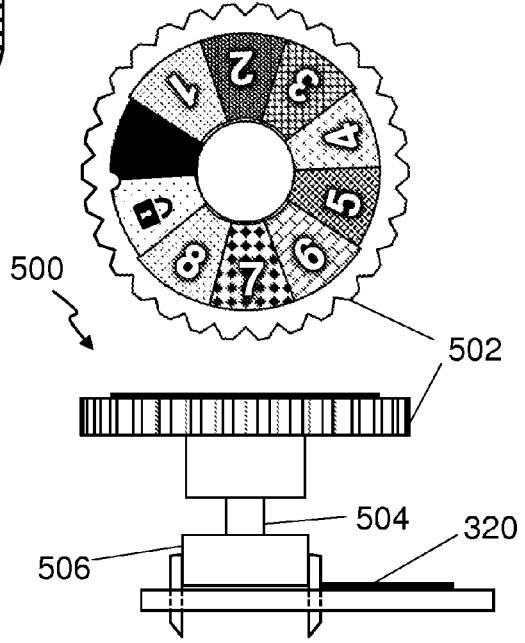
FIG. 5 shows a diagram of a dial selector of the power node of FIG. 1A or 1B.

FIG. 5 shows one embodiment of a dial selector 500. A dial selector wheel 502 is used to rotate a shaft 504 that actuates a dial selector switch 506. Switch signals corresponding to selected states are coupled to the I/O block 210 via dial selector switch signal line 320. Any suitable switch known to persons of ordinary skill in the art may be used. Suitable switches include rotary and slider type switches and analog and digital switches. In an embodiment, a switch opens and closes circuits such as digital circuits corresponding to each switch position. In another embodiment, a binary coded decimal ("BCD") rotary switch is used. In yet another embodiment, an analog switch such as a potentiometer together with an analog to digital converter is used.

Where the dial selector 500 is used to designate location, an embodiment includes a multi-colored dial selector wheel 502 having eight colored segments arranged around the periphery of the wheel. In addition to the eight colored segments, black and white segments are included. Each segment corresponds to a switch 506 position. The colors may be used to indicate particular rooms or spaces within a home or another multi-space, multi-use environment such as an office suite or building. Black may be used to indicate a spare or user designated variable and white may be used to indicate a power node monitoring only state where control functions are disabled.

In some embodiments, a temperature sensor 218 is used to sense a temperature of the environment where the power node is located. Signals from the temperature sensor are coupled to the I/O block 210 via a temperature sensor signal line 322.

Figure 6:
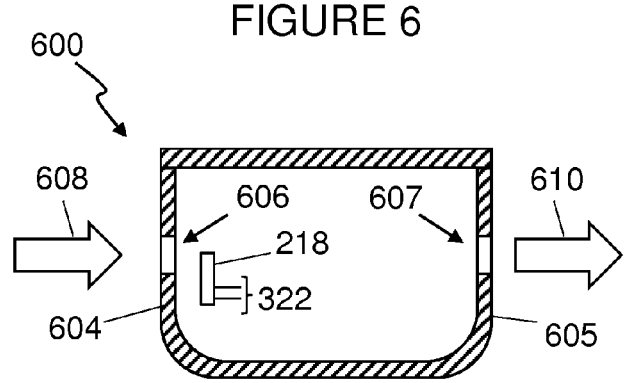
FIG. 6 shows a diagram of a temperature sensor of the power node of FIG. 1A or 1B.

FIG. 6 shows one embodiment of a temperature sensor located in a power node housing 600. A first surface area of a power node housing 604 has an air inlet 606 and a second surface area of the power node housing 605 has an air exhaust 607. In various embodiments, the air inlet and exhaust are located to facilitate a natural draft 608, 610 through the power node housing such as a draft created by a heated electrical component. The temperature sensor 218 is located near the inlet and temperature sensor signals are coupled to the I/O block via temperature sensor signal line 322.

In operation, various embodiments of the power node 100A/100B are capable of supplying power to a load or, in embodiments with multiple power channels 308, to multiple loads. Load control including switching loads on and off is enabled by network communications 107 between a command issuing device such as a user device 110, network manager 106, or data center 194, and a command receiving device for a particular power node 132. For example, a command issued from the user device to turn a particular outlet on may be routed via the network to a particular power node communications block 132. The power node processor 212 receives the command from the I/O block 210, interprets the command, and sends the power switch an on signal 204 via the I/O block and signal line 160.

Outlets 206 may be capable of being turned on and off by direct commands from a user as described above. Outlets can also be turned on and off under program control. For example, under program control an outlet's state may be selected based on one or more of time, a selected load, energy pricing, power consumption during a particular period of time, environmental conditions, or other data available to a processor in signal communication with the power node I/O block 208.

Energy reporting and management functions are enabled by the bus voltage sensor 302, power channel current sensor 304, the outlet insertion switch 306, and the power node power analyzer 208. Power analyzer inputs include power node bus voltage sensed by the power node bus voltage sensor and outlet current(s) sensed for each power channel 308 by a respective power channel current sensor.

The power provided to each outlet 206 is know because the current supplied to each outlet is measured 304 and a single bus voltage that is common to all outlets is measured 302. From these measurements, the power analyzer 208 can send data to the I/O module 210 including instantaneous current and voltage. In various embodiments, the power analyzer can send additional data to the I/O module including one or more of real power, RMS voltage and current, apparent power, reactive power and fundamental power.

Data from the power analyzer 208 is available to any processor in signal communication with the I/O block 210. For example, a user device 110 can receive data from the power analyzer via the network 107. Instantaneous values, trends, and summaries of data are available from power analyzer data stored in the user device or another network accessible memory device, any of which can be reported to the user. In addition, outlet insertion switch 306 status is available to the I/O block, a first state indicating a plug is inserted in the outlet and a second state indicating no plug is inserted in the outlet.

In some embodiments, data from external sources, such as energy prices reported by an electric utility or electric system operator, are available whether manually entered or acquired from the network via a connection such as an internet connection via the data center 194 or an internet gateway. Using this electric rate/cost information and the electric consumption information, the user device is capable of reporting cost metrics such as instantaneous electric supply costs, summarized electric costs, period specific electric costs, and suggestions for lowering electric costs such as shifting electric loads to less costly times of the day.

In a power node with multiple outlets, a default mode may designate one of the outlets 206 as a master outlet. Depressing the power node "On" button 15 enables the master outlet by closing the respective power switch 204. In the default mode, all power node outlets other than the master outlet are slave outlets. If the master outlet is supplying power to a load 121, the slave outlets are similarly enabled. If the master outlet is not supplying power to a load, the slave outlets are disabled. Where interrelated components of a system such as an entertainment system connect with a common power node 100A, default mode operation allows one of the components to function as a master for turning slave components on and off.

In various embodiments, a processor in signal communication with the power node I/O block 210 infers the nature of the load 121 by analyzing data available from the power node 100A/100B. The method for inferring the nature of the load is referred to herein as Basic Analysis.

A variety of output data may be input and output from the power node power analyzer 208, the insertion switch 306, and the dial selector 216. The power node analyzer 208 may use inputs such as, but not limited to, instantaneous voltage measurements from the voltage sensor, instantaneous current measurements from the current sensor, and/or temperature measurements from the temperature sensor. It may output information such as, but not limited to, instantaneous, average, or root-mean-square (RMS) voltage, instantaneous, average, or root-mean-square (RMS) current, real, apparent, reactive or fundamental instantaneous, RMS or average power, or instantaneous or average temperature. The insertion switch may use plug insertion as an input and may output a state of the switch as open or closed contacts to indicate whether or not a plug is inserted. The dial selector may take a position of the color wheel (or other selection device) as its input and output information such as, but not limited to, a number, a room location, a set of neighbor appliances, a time of use, and/or type of power strip (single outlet or multiple outlets).

Basic analysis uses power clues and contextual information to identify likely device classes for a load, typically a home appliance. Basic analysis may detect whether a plug is inserted and consider standby and operational power consumption, power factor, and peak versus RMS current. In addition, one or more environmental factors including room location, neighbor appliances (in the same room), time of use, and type of power node (single outlet or multiple outlet) may be considered.

In basic analysis, load assessment typically utilizes a few data snapshots. For example, an appliance requiring 10 watts standby power and 200 watts operational power is located in a family room. These data fit the profile of a television and assuming no contra indication from the power factor and peak versus RMS currents, this load would likely be matched with a television.

Data for matching loads to appliances is in various embodiments maintained in storage accessible to the local network 107 or the external network 193. Local data storage devices include the gateway host 108 and the user device 110. External data storage devices include storage devices such as semiconductor and hard disc storage located in the datacenter 194.

Once an outlet/load is matched to a particular appliance, there is no need to run the matching process again unless the appliance is unplugged. In various embodiments, the plug insertion switch 306 sets a flag when a plug is inserted in a respective outlet 206. A set flag results in the load assessment being run for the indicated outlet/load; once the assessment runs, the flag is cleared. With respect to a particular outlet, removal of a plug and reinsertion of a plug resets the flag, and causes the matching process to execute again.

Intermediate analysis examines patterns of use or behavior patterns to perform load assessments. Intermediate analysis may include monitoring power consumption to determine a load's duty cycle including frequency of use and duration of use.

In intermediate analysis, load assessment utilizes data snapshots taken at a low frequency. For example, power consumption might be checked and recorded once per minute. If the load being monitored is turned on frequently and operates for an extended period such as one or more hours each time it is turned on, these data might again suggest the appliance is a television.

Data for matching use profiles can be stored on the local network 107 or external to the network. Local data storage devices include the gateway host 108 and the user device 110. External data storage devices include computers located in the datacenter 194.

Advanced analysis assumes each load has a characteristic electrical signature, for example the frequency content of its voltage and current waveforms. Of particular interest may be the voltage waveform when the device is turned off or cut off from power and/or the current waveform when the device is turned on or connected to power.

As discussed above, information may be transmitted over the local network 107 and, in some embodiments, over the external network 193. In an embodiment, network information exchanges include transmission of one or more network messages such as one or more of: a) waveform profiles; b) change detection system (CDS) filter profile; c) meter report; d) over current alert; and, e) instantaneous power.

Figure 7:
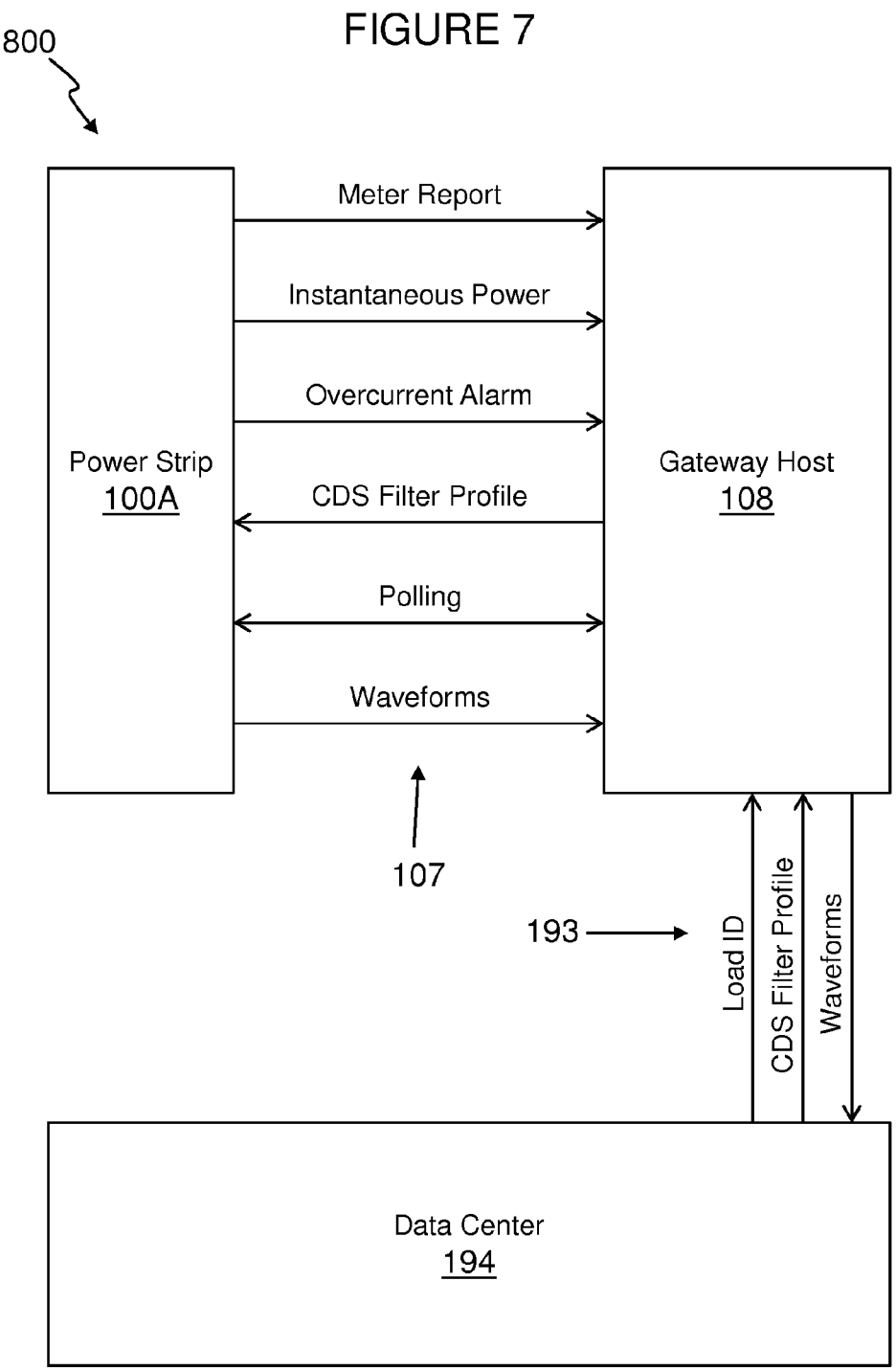
FIG. 7 shows a first view of messages associated with the energy management system of FIG. 1C.

FIG. 7 shows a system 800 with messages exchanged on the local nework 107 and external network 193. On the local network 107, messages are exchanged between power strip 100A/100B and the gateway host 108. The power strip 100A/100B may transmit meter report, instantaneous power, instantaneous voltage/voltage waveform profile, instantaneous current/current waveform profile, and over current alarm to the gateway host 108. In some embodiments (see below), the gateway host 108 may transmit change detection system filter ("CDS") profiles to the power strip 100A/100B.

In some embodiments, either of the power strip 100A/100B or the gateway host 108 polls the other device to obtain information. For example, the gateway host 108 might poll the power strip 100A/100B, requesting a meter report. In response to the polling request, the power strip 100A/100B would send the meter report to the gateway host 108.

On the external network 193, messages are exchanged between the gateway host 108 and the data center 194. The gateway host 108 transmits waveform profiles to the data center 194 and the data center 194 transmits appliance identifications and matched CDS filter profiles to the gateway host.

Messages may be used in a variety of ways. Instantaneous power shows instantaneous consumption based on on-demand current and/or power readings. Instantaneous power readings may be transmitted on demand, in response to network query, or upon CDS event. They may be used in ways such as (but not limited to) the generation of composite dashboards, overall household load, and breakdowns of individual contributions. By use of CDS change-threshold detection polling can be eliminated and network traffic reduced.

Meter reports may integrate instantaneous power over time to provide power consumption during particular time periods by aggregating power consumption reports. Smart meter consumption reporting for individual outlet(s) may be voluntary, scheduled, or on-demand. It may be thought of as conventional power consumption metering. Some embodiments may utilize a Z-Wave standard smart meter class to implement efficient scheduling and automatically send pertinent consumption reports to a gateway host.

Waveform profiles show how voltage and current vary with time; notably, waveform profiles of voltage and/or current may be, as discussed above, available for each outlet/load 206/121. Waveforms of calculated parameters (such as power) may also be generated by the power analyzer. These messages may be sent from the power strip 10A to a gateway host 108 upon threshold events generated by power strip change detection system (CDS). Waveform profiles may be used to match loads with known appliances. In the datacenter 194, waveform profiles may be be matched against a signature database and used as an indicator for device or device class identification. Waveform profiles may also be used for automation purposes in identification of internal appliance states.

Overcurrent alarms may provide a warning that a current rating and/or capacity of the power strip 100A, or a single outlet 206, has been exceeded. They may be sent from the power strip to a gateway host upon a signal from the power node's Over Current Protection System (OCPS). Whenever an over current situation occurs, there may be short circuit hazards involved, or incorrect operation of the device plugged into the power strip 100A/100B. In either case, generating these over current alert messages on the network provides a means to inform users via a user device or via notice from the data center that remedial action should be taken. In some embodiments, the power strip may automatically cut off power to the offending outlet(s) in addition to sending a message.

A change detection system ("CDS") profile provides filter parameters controlling change detection system filter behavior for a single outlet/load. CDS filter parameters include any of voltage, current, power, insertion switch state, temperature, and metrics based on these parameters. They may be sent from a gateway host to the power strip to modify change detection filter properties for a single outlet 206. Filter profiles are used to fine tune the power strip hosted change detection system which limits network traffic to only significant or interesting traffic such as significant waveform profiles and significant power consumption changes.

As mentioned above, one device may poll another device to obtain information. Another alternative is automatic reporting triggered by a changed state. In this embodiment, the processor 212 includes a change detection system 311 that monitors one or more variables such as power, current, and voltage. A change in the variable being monitored that exceeds a threshold value triggers automatic reporting. For example, if a threshold power change of 10 watts is set, a load change from 195 to 200 watts would not be reported by the CDS; but, a load change from 195 to 205 watts would be reported.

From the above, it can be seen that use of CDS triggered reporting rather than polling offers a means to reduce network traffic. Traffic is reduced because only exceptional events are reported over the network. Criteria for defining exceptional events are defined in CDS filter profiles. The filter profile to be applied to a particular outlet/load 206/121 is selected when waveform data sent to the data center is matched with a particular appliance. For example, if load waveform data sent to the datacenter is matched with a television known to consume 10 watts in standby and 200 watts in operation, the CDS filter profile might ignore spurious/uninteresting load changes below 10 watts.

Reporting can also be triggered based on elapsed time. For example, instantaneous power might be reported automatically every 2 seconds, or other time period in other embodiments. In an embodiment, reporting is based on a hybrid system including multiple reporting systems. For example, any plurality of time triggered reporting, CDS triggered reporting, and polling are used together.

Figure 8:
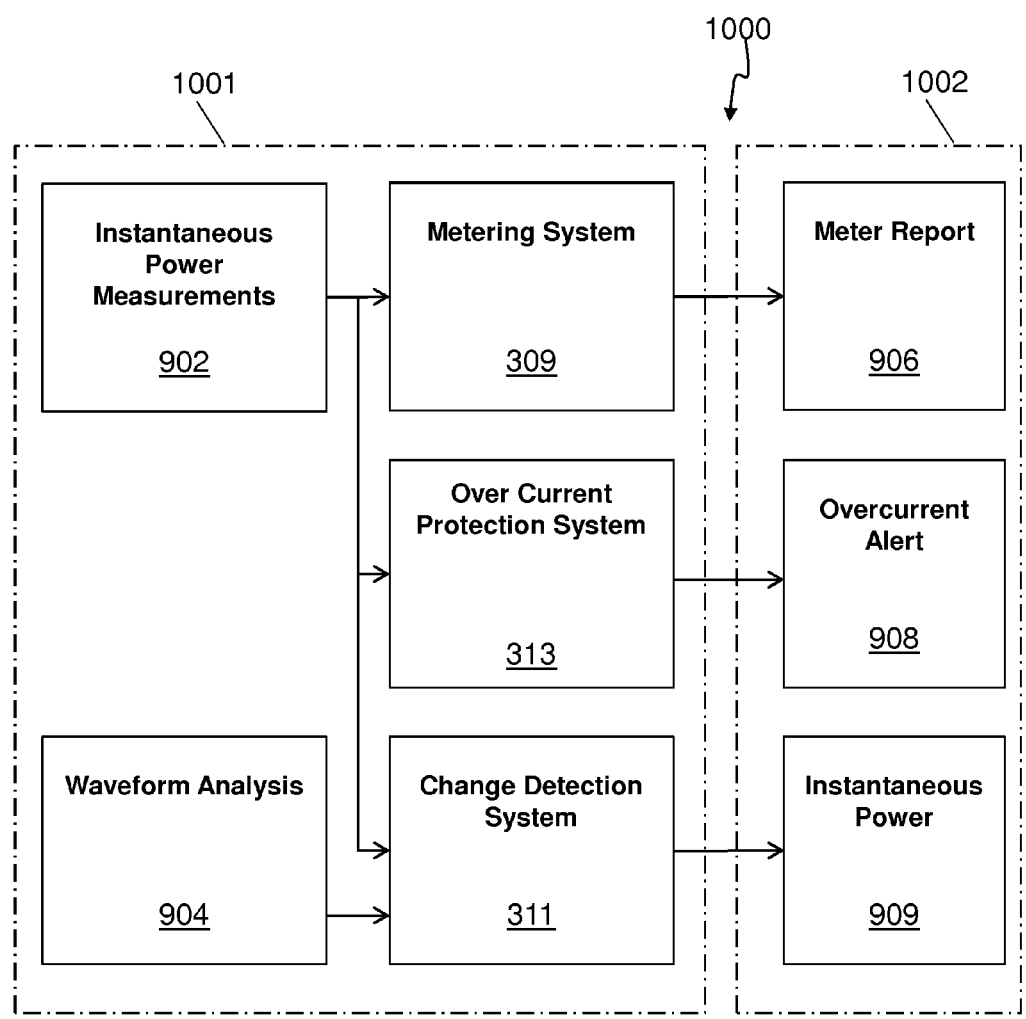
FIG. 8 shows a second view of messages associated with the energy management system of FIG. 1C.

FIG. 8 shows an embodiment with polled, timed, event, and CDS reporting 1000. Messages may be constructed in block 1001 and sent over the network as the messages in block 1002. Instantaneous power may be measured 902 every 2 seconds and sent to a metering system 309, an over current protection system 313, and a change detection system 311. Metering reports 906 from the metering system 309 may be triggered based on polling or scheduled messaging. Over current alerts (or alarms) 908 from the over current protection system 313 may be triggered when an over current event occurs. Instantaneous power reports 909 from the change detection system 311 may be triggered when a change in instantaneous power exceeds a predetermined threshold value. In some embodiments, the two most recent samples may be used for detecting a change. In other embodiments, more samples may be used to create a moving average, allowing for noise in the samples to be reduced In some embodiments, advanced analysis such as waveform analysis 904 may be performed and used as an input to the change detection system 311. Measurements may be taken at regular intervals (such as every 12 seconds or other intervals) to create the waveforms. In addition to the uses mentioned above, embodiments of the power node for energy management 100A/100B include informing users of individual appliance power consumption, enabling control of individual outlets to, inter alia, interrupt appliance standby power flows, and managing or lowering one or both of energy consumption and energy cost.

In one commercial embodiment, a consumer kit may include a plurality of multi and/or single outlet power nodes 100A/100B, a gateway 108, and a controller or user device 110. During manufacture and testing, these devices may be preconfigured with identification codes allowing interoperation. The controller may also be preprogrammed with home, night and away selections. The home selection may enable all of the power node outlets 206 by closing the respective power switches 204. The night selection may enable the default mode of multi outlet power nodes and disable single outlet power nodes. The away selection may disable all of the power node outlets.

FIG. 9 shows a system 900 of several devices plugged into a power node 100D. Power Node 100D may have a power cord 918 that plugs into a standard wall outlet to connect to AC power. The AC power of the home may have other devices connected that implement a power line communication (PLC) networking protocol and the power node 100D may also include a PLC network interface as shown in FIG. 2B. The power node 100D may have several power sockets 914A-E and several network connectors 916A-F. The power node 100D may provide a graphic indication that certain power sockets are associated with certain network connectors such as boxes made of dashed lines silkscreened onto the power node 100D. In the embodiment of power node 100D as shown, power outlet 914A is associated with network connector 916A, power outlet 914B is associated with network connector 916B, power outlet 914C is associated with network connector 916C, power outlet 914D is associated with network connector 916D, and power outlet 914E is associated with network connector 916E. Network connector 916F may not be associated with any power outlet. Other embodiments may have power outlets that are not associated with any network connector.

TV 950 may be drawing electrical power from power outlet 914E through power cord 951 which may have an electrical plug that is plugged into the power socket 914E. The TV 950 may also provide functionality such as, but not limited to, internet TV, digital living network alliance (DLNA) compliant media streaming, remote configuration, or other functions that may use a network. The TV 950 may then have a network cable 952 plugged into network connector 916E.

Networked lamp 980 may allow for control of its on/off state and/or brightness through a network. The networked lamp 980 may have its power cord 981 plugged into socket 914C and be drawing power from socket 914C. The networked lamp 980 may have a network cable 982 plugged into network connector 916D. The network cable 982 and the power cord 981 may be plugged into a network connector 916D and power socket 914C respectively, that are not associated with each other.

Networked coffee pot 960 may provide remote brew initiation, remote status, or other functionality over a network. The networked coffee pot 960 may have its power cord 961 plugged into socket 914B and be drawing power from socket 914B. The networked coffee pot 960 may have a network cable 962 plugged into network connector 916B allowing the networked coffee pot 960 to communicate over the bridged network 107.

Vacuum cleaner 970 may be a legacy device with no network functionality. The vacuum cleaner 970 may be plugged into power socket 914A via power cord 971. Network connector 916A may not have anything plugged in. Computer system 990 may be plugged into a wall outlet directly and not be drawing power from the power node 100D. But the computer system 990 may have a network cable 992 plugged into network connector 916F to access the bridged network 107.

FIG. 10A is a flowchart 510 of a general method of reporting what device is plugged into a particular power socket of a power node 100D. The presence of a device, such as the TV 950, plugged into a network connector 916E of the power node 100D may be detected at block 511. The processor 212 may communicate with the TV 950 through the network connector 916E and receive information about the TV 950 through the network connector 916E at block 512. The information may be very minimal, such as only the MAC address, or may be a complete device description such as might be found using simple service discovery protocol (SSDP) in universal plug and play (UPnP).

The particular power socket 914E where the TV 950 is plugged in may be identified at block 530A. In a simple embodiment, the processor 212 may be pre-programmed to understand a pre-determined association between the network connector 916E and the power socket 914E. Other embodiments may be used in place of the simple block 530A such as flowchart 530B, flowchart 530C, or other methods, to identify the particular power socket 914E where the TV 950 is plugged in. Flowcharts 530B and 530C are described below.

At least some of the information received about the TV 950 as well as an identifier of the particular power socket 914E may be sent across the PLC network interface in the power node 100D at block 514. The identifier of the particular power socket 914E may be dependent on the embodiment but may include such information as the network address, such as the internet protocol (IP) address and/or the MAC address of the processor 212 in the power node and an identifying number associated with the particular power socket 914E within the power node 100D. In some embodiments, additional information about the TV 950 may also be sent across the PLC network.

At various points in time, the processor 212 may receive commands to turn power on or off at the particular power socket 914E in block 515. The commands may come from the gateway 108 or other device based on a timer, a user input, changing energy cost or availability, another device being turned on or off, or other event. If the power node 100D loses power, the method may end at block 516.

FIGS. 10B and 10C are flowcharts 530B, 530C depicting alternative methods of determining what device is plugged into a particular power socket of a power node 100D that may be used in place of block 530A in flowchart 510. In some embodiments, the network connectors may not have a physical association with the power sockets or a user may plug the power cord of a device into a power socket and the network connector into a network connector that is associated with a different power socket. The methods described in flowcharts 530B and 530C may allow the particular power socket used by a device to be identified. The methods shown in flowchart 530B and 530C may be used if the second network in the power node 100D is not a wired network, but uses wireless communication as these methods do not rely on a physical connector for the network.

Flowchart 530B may start at block 531B if it is time to identify a particular power socket associated with a device, such as the networked coffee pot 960, that is connected to network connector 916B, such as in place of block 530A in flowchart 510. The processor 212 may turn off the power to a power socket in the power node 100D, such as power socket 914A, at block 532B. The processor 212 may attempt to communicate with the networked coffee pot 960 over the network connector 916B at block 533B. Since the networked coffee pot 960 is still receiving power through power outlet 914B, the communication is successful. Because the communication at block 533B is successful, the processor 212 may turn the power back on for power socket 914A and turn off power to power socket 914B at block 534B although in some embodiments, the power to the previous power socket 914A may be left off, or left off if the power socket 914A was off before the method started. In other embodiments, only those power sockets that are on when the method starts may be checked.

Once the next power socket 914B has been turned off, communication with the networked coffee pot 960 may be attempted again at block 533B. Since the power has been turned off for power socket 914B, the networked coffee pot 960 is now off and the communication attempt is unsuccessful, so the processor 212 may now identify that the networked coffee pot 960 is plugged into power socket 914B at block 535B. Power to power socket 914B may be turned back on at block 536B and the rest of the method continued at block 537B.

Flowchart 530C shows yet another alternative embodiment of identifying a particular power socket associated with a device, such as the networked lamp 980, that may be using network connector 916D. If it is time to identify the particular power socket being used by the networked lamp 980 at block 531C, the information that was previously received, such as in block 512 of flowchart 510, may be used to predict power parameters at block 532C of the networked lamp 980.

In some embodiments, the information received may include power parameters, such as on power, off power, power factor, ripple current, or other parameters. In other embodiments, the information received may include the type of device, such as a TV, coffee pot, lamp, vacuum, or other type of device that may be used to predict a typical power parameter for such a device. For example, a networked lamp may draw very little power, <100 milliwatts (mW), when the lamp is off, and may draw the wattage of a typical incandescent light bulb when on, such as 40 watts (W), 60 W, 75 W or 100 W. In other cases the information received may be used to acquire additional information about a device. In some embodiments, the information received may be a MAC address that may then be used for SSDP queries to acquire more detailed information about the networked light 980. In one embodiment, the make and model of the networked lamp 980 may be acquired, which may then be used to look up information on the internet or other database to determine a power parameter for that particular make and model of networked lamp 980. For the purposes of this description, a prediction of 60 W for overall power usage may be made for the network lamp 980 based on the information received.

At block 533C, the processor 212 may measure one or more power parameters at each power socket 914A-E. In a typical embodiment, a simple RMS power measurement may be taken. Other embodiments may measure a second power parameter such as power factor to help identify whether the load is an inductive load as would be typical for an electric motor. Other embodiments may not measure root-mean-square (RMS) power but may measure RMS current or ripple current or one or more other parameters related to the power delivered to each power socket 914A-E. In the system 900, measurements of 800 W for power socket 914A, 100 mW for power socket 914B, 61 W for power socket 914C, 0 W for power socket 914D and 157 W for power socket 914E are taken at block 533C and compared to the predicted power of 60 W for the networked lamp 980 at block 534C. Since the power or 61 W at power socket 914C is the closest to the predicted power of 60 W for the networked lamp 980, power socket 914C is identified as the particular power socket used by the networked lamp 980 and the overall method may continue at 535C.

Various algorithms may be used to determine which measured value is closest to the predicted value including a simple difference, a difference with limits so that if the value is outside a maximum or minimum limit, the value may not be considered, curve fitting, or other algorithms. If more than one power parameter is predicted and measured, various algorithms using one or more of the parameters may be used including weighted sums of the differences, using one parameter as a limiting range and another for a difference, or any other algorithm.

Because the networked lamp 980 is using a network connector 916D and a power socket 914C that are not physically associated with each other, if the processor 212 simply uses the pre-determined association, an incorrect power socket 914D may be identified. By using the method shown in either flowchart 531B or 531C, the proper particular power socket 914C being used may be identified.

In many embodiments, the methods described in FIG. 10A-C may be implemented using computer code running on the processor 212 as described above, but in some embodiments, parts of one or more block, all one or more block, or all of the blocks of the methods shown may be implemented using other circuits or other computers that are in the power node, or outside of the power node but in communication with the power node. In some embodiments, the methods may be embodied as a computer program product with computer code stored on a non-transitory computer readable medium.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements. The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to an element described as "an LED" may refer to a single LED, two LEDs or any other number of LEDs. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various embodiments provided above is illustrative in nature and is not intended to limit the invention, its application, or uses. Thus, different variations beyond those described herein are intended to be within the scope of the embodiments of the present invention. Such variations are not to be regarded as a departure from the intended scope of the present invention. As such, the breadth and scope of the present invention should not be limited by the above-described exemplary embodiments, but should be defined only in accordance with the following claims and equivalents thereof.

What is claimed is:

1. A power node comprising:
   a power plug;
   one or more power sockets including a particular power socket;
   a power switch interposed between the power plug and the particular power socket to control a flow of power from the power plug to the particular power socket;
   a voltage sensor operable to measure voltage at the particular power socket;
   a current sensor operable to measure current flowing through the particular power socket;
   a first network interface utilizing a powerline communication physical layer to communicate through the power plug;
   bridge circuitry to bridge the first network interface to a second network interface utilizing a second physical layer; and
   a processor that is configured to:
      receive information, through the second network interface, about one or more devices plugged into the one or more power sockets;
      measure at least one electrical parameter of the particular power socket;
      compare the at least one electrical parameter to expected values for the one or more devices based on the information received about the one or more devices;
      identify a particular device of the one or more devices that receives power from the particular power socket based, at least in part, on the comparison;
      send at least some of the information about the particular device and an identifier of the particular power socket across the first network interface;
      send a message across at least the first network interface containing information based on the at least one electrical parameter;
      receive a command over the first network interface; and
      control the power switch based on the received command.

2. The power node of claim 1, wherein the processor identifies the particular device based, at least in part, on a predetermined association between the particular power socket and a network connector coupled to the second network interface that is used to receive the information about the particular device.

3. The power node of claim 1, wherein the processor is configured to turn off the power switch and attempt to communicate with the one or more devices through the second network interface to identify the particular device.

4. The power node of claim 1, wherein the second network interface includes one or more ethernet connectors and uses a wired ethernet physical layer.

5. The power node of claim 1, further comprising:
   an insertion switch coupled to the processor and having an electrical state indicating whether a device plug is inserted in the particular power socket;
   wherein the processor is further configured to identify the particular device in response to a change in the electrical state of the insertion switch.

6. The power node of claim 1, further comprising:
   a selector device configured to provide an environmental variable from a plurality of selectable environmental variables;
   wherein the processor is further configured to use the environmental variable received from the selector device to communicate over the bridged network.

7. The power node of claim 1, the power switch being a first power switch, the power node further comprising:
   a second power socket of the one or more power sockets;
   a second power switch interposed between the power plug and the second power socket; and
   a first network connector and a second network connector communicatively coupled to the second network interface and physically accessible from outside the housing;
   wherein the particular power socket is associated with the first network connector;
   the second power socket is associated with the second network connector; and
   the processor is further configured to identify a second device of the one or more devices that receives power from the second power socket.

* * * * *